No. 817,084. PATENTED APR. 3, 1906.
W. E. MOORE & J. W. BRIDGE.
LUBRICATING DEVICE.
APPLICATION FILED JUNE 6, 1905.
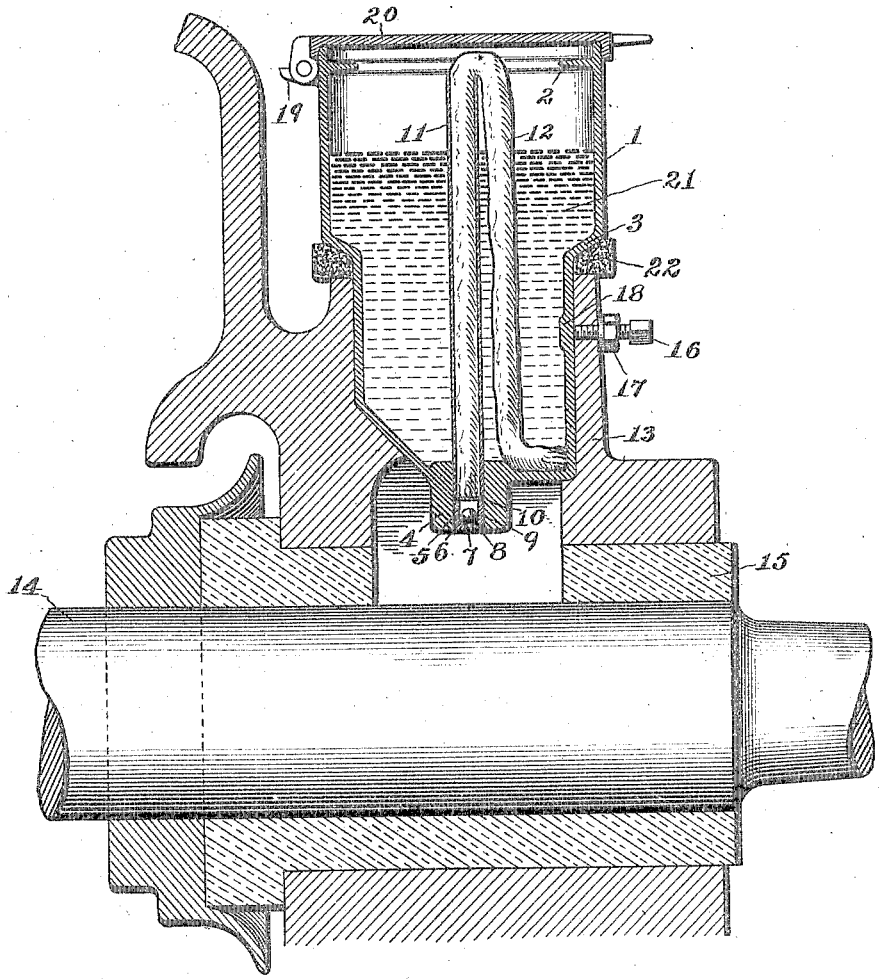
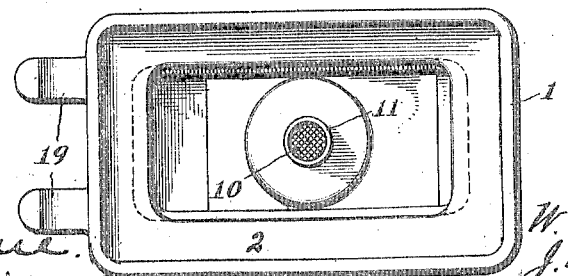
Witnesses
Geo. H. Byrne.
J. R. Martin
Inventors
W. E. Moore
J. W. Bridge
by their Attorney
John H. Wolf

UNITED STATES PATENT OFFICE.

WILLIAM E. MOORE, OF CONNELLSVILLE, AND JAMES W. BRIDGE, OF NEWHAVEN, PENNSYLVANIA.

LUBRICATING DEVICE.

No. 817,084.  Specification of Letters Patent.  Patented April 3, 1906.

Application filed June 6, 1905. Serial No. 263,939.

*To all whom it may concern:*

Be it known that we, WILLIAM E. MOORE, residing at Connellsville, and JAMES W. BRIDGE, residing at Newhaven, in the county of Fayette and State of Pennsylvania, citizens of the United States, have invented certain new and useful Improvements in Lubricating Devices, of which the following is a specification.

The principal object of this invention is the providing of means whereby electric-railway motors constructed for grease lubrication of their journal-bearings may be converted into oil-lubricated motors.

The lubrication of electric-railway motors has for a number of years been effected almost exclusively by the use of grease placed in receptacles known as "gravity grease-cups," located over the journals. Grease, however, is satisfactory for such motors only when the bearing is heated sufficiently to make the grease run like oil. For this reason, as well as others, oil has been found to be superior to grease as a lubricant for railway-motors and is now being used to a considerable extent for that purpose. The practical question, therefore, arose as to how the many thousands of motors equipped with gravity grease-cups could be converted into oil-lubricated motors.

The primary object of this invention is to effect a solution of the problem by using the former grease cups as receptacles for oil-cups constructed with this peculiar end in view and adapted to meet the requirements for more perfect motor lubrication.

With the above object in view our invention consists in the novel combination and arrangement of parts herein described, and more particularly pointed out in the accompanying claims.

In the accompanying drawings, which form a part of this specification, Figure 1 represents in vertical section a portion of a casing and journal-bearing of an electric-railway motor designed originally for grease lubrication and provided with our improved form of oil-cup, and Fig. 2 represents a top plan view of the cup with its cover removed.

Referring to the accompanying drawings, A represents a portion of an electrical-motor casing provided with a journal-bearing portion B, having a receptacle C, originally designed for a grease-cup.

E represents a bushing for the journal D.

In carrying out our invention we employ the former grease-cup C as the receptacle for an oil-cup, which latter fits bodily thereinto. This oil-cup consists, among other parts, of a cup portion 1, preferably made of cast-steel, though it may be made of pressed metal or built up in any other desired way out of any desired material. Near the upper end of the cup, and preferably formed integral therewith, is an inwardly-extending ledge or flange 2, the object of which is to prevent waste of oil and the entrance of dust into the cup, as will hereinafter more fully appear. In the form of the cup shown the lower half is made slightly smaller in cross-section than the upper portion, forming a shoulder 3. On the lower end of the cup is an extension 4, through which passes an opening 5 to the interior of the cup. Into the lower end of this opening is tightly forced a hollow plug 6, having a contracted oil-outlet 7, forming a valve-seat 8, upon which rests a ball-valve 9. Upon the top of this hollow plug is placed a screen 10, consisting of a disk of fine-mesh wire or other suitable material. Into the upper portion of the opening 5 is forced tightly a tube 11, which extends from said screen upward a suitable distance, preferably to a point near the top of the oil-cup. Into this tube extends a wick 12, which passes from a suitable point in the oil-cup, preferably the bottom thereof, down to the screen or a proper distance therefrom. The portion of the cup below the shoulder 3 is made of such a shape as to fit easily but snugly into the receptacle C, the shoulders 3 resting upon a felt strip 13 around the top of the opening of said receptacle. The object of this felt strip is to prevent dust and dirt from working down the side of the cup to the journal. The lower portion of the cup is shaped to conform to the interior of the receptacle C, as shown, the extension 4 passing down to a point near the journal, as shown. The cup is held fast in position by a set-screw 14, arranged to be locked by a nut 15. A stiffening-rib 16 extends around the interior of the cup in line with the portion engaged by said set-screw. Near the upper edge of the cup are formed two lugs 17, to which are hinged a suitable top 18. Inasmuch as the hinged top of the former grease-cup would naturally be out of use as long as the oil-cup is inserted in such receptacle, this cover may be used as the cover for the oil-cup.

It will be observed from an inspection of the drawings that the oil 19 will be fed through the wick by capillary attraction down to the screen 10 and thence to the ball-valve, which by the vibration of the bearing allows the oil to be fed down through the outlet 7. When the vibration of the bearing ceases, the ball 9 becomes seated, thus cutting off the flow of oil. The oil is prevented from shaking out of the top of the cup, due to the vibration of the said cup, by means of the flange 2. This flange, moreover, acts as a dust-guard and is an important factor in keeping the oil clean.

By supplying motors and the like with the oil lubricating device herein described a more reliable feed for a longer time is secured than by the former practice of gravity grease lubrication. Moreover, the danger of bearings running hot due to lack of inspection is reduced. Moreover, cleaner lubrication is insured by this device due to the filtering action of the wick and screen. This screen also catches any lint from the wick, should a cotton wick be used, and prevents the said lint from passing down to the ball-valve, and thereby tending to hold the ball from its seat, thus overcoming a very serious disadvantage which is inherent in many forms of wick-feed cups. A further advantage of this form of oil-cup is that the joints are reduced to a minimum, there being no holes drilled in the cup except the opening 5 in the bottom thereof. This reduces the leakage of oil to a minimum.

In practice the bottom of the oil-cup may extend, as shown, down into close proximity with the journal, and thus the heating of the journal and bearing may be used to prevent the oil from congealing in extremely cold weather.

While we have thus described a specific form of our invention and shown the same as applied in a particular way to a motor-bearing, it is not our intention to limit ourselves to the specific case illustrated, since the principle of the invention may be embodied in many different specific forms and applied to many different kinds of journal boxes and bearings.

What we claim is—

1. An oil-cup having a non-supporting integral projecting lug on the bottom of the cup and an oil-outlet therethrough leading from the interior of said cup, a valve controlling said oil-outlet, a wick-feed to deliver oil to said valve, and an annular ledge on the exterior of the body of the cup adapted to support said cup.

2. The combination with a casing provided with a journal-bearing portion having a receptacle therein and a passage leading from the interior of said receptacle to the journal, of an oil-cup adapted to fit bodily into said receptacle and to extend above the same, the said cup being provided at its lower end with a non-supporting extension 4 adapted to pass through said passage and into proximity to the journal and having an oil-outlet therethrough leading from the interior of said cup, a valve controlling said oil-outlet, a wick-feed controlling the supply of oil to said valve, and an integral supporting-ledge extending around the exterior of the body of the cup.

3. The combination with a casing provided with a journal-bearing portion having a receptacle therein and a passage leading from the interior of said receptacle to the journal, of an oil-cup adapted to fit bodily into said receptacle, to extend above said receptacle and provided at its lower end with an extension adapted to pass through the bottom of said receptacle into said passage and into proximity to the journal and with an oil-outlet through said extension, a valve controlling said oil-outlet, a wick-feed controlling the supply of oil to said valve, an annular supporting-ledge around the outside of said cup, adapted to rest on the upper edges of said receptacle, and an oil-guard flange extending around the interior of the cup near its top.

4. The combination with a casing provided with a journal-bearing portion having a receptacle therein and a passage leading from the interior of said receptacle to the journal, of an oil-cup adapted to fit bodily into said receptacle and having an aperture through its lower end, a hollow plug fitting tightly into said aperture and provided with an oil-outlet, a ball-valve within said hollow plug controlling said outlet, a screen within said aperture over said valve, a tube fitting tightly into said aperture above said screen and extending upward to a point near the top of the cup, and a wick extending down into said tube from the interior of the cup.

In testimony whereof we affix our signatures in presence of two witnesses.

WILLIAM E. MOORE.
JAMES W. BRIDGE.

Witnesses:
  E. A. WILCOX,
  CRETE LANG.